Jan. 25, 1955
R. F. WILSON
2,700,181
BUILDING FORM FOR FUEL CELLS
Filed Sept. 17, 1953
2 Sheets-Sheet 1
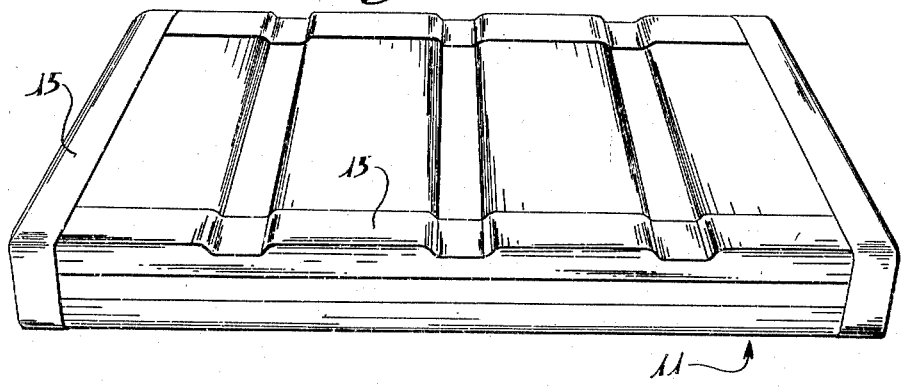
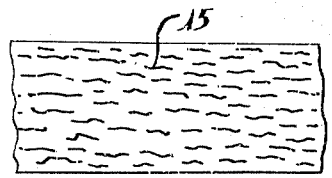
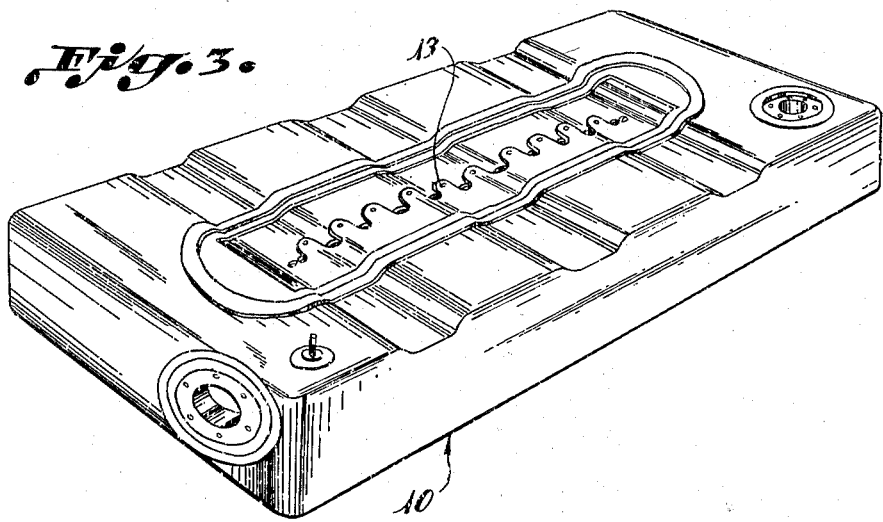
INVENTOR.
ROBERT F. WILSON
BY
*H. G. Fraser*

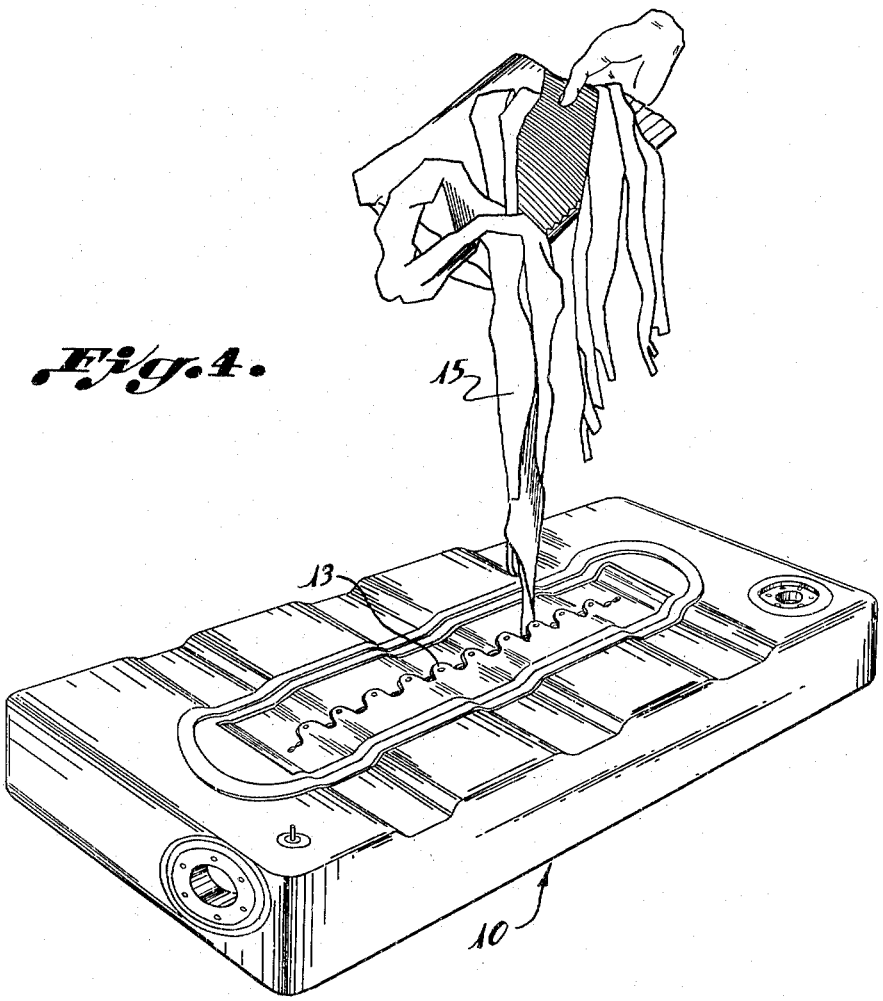

United States Patent Office 2,700,181
Patented Jan. 25, 1955

2,700,181

BUILDING FORM FOR FUEL CELLS

Robert F. Wilson, San Gabriel, Calif., assignor to The Firestone Tire & Rubber Company, Akron, Ohio, a corporation of Ohio Application September 17, 1953, Serial No. 380,759

5 Claims. (Cl. 18—45)

This invention relates to fuel cells and similar molded products, and more particularly to a building form for such fuel cells.

Fuel cells for aircraft and the like are presently manufactured by building up a laminated construction upon the exterior of a building form. Such a form is made of material, such as various paper products, which will disintegrate in water. After the fuel cell is built on the form and while it is still on the form, it is subjected to vulcanizing temperatures in an open air vulcanizing oven and cured to its final shape. After the cure, the form is removed by soaking it in water for an interval of time sufficient to soften and break it up so it may be removed piece-meal through the cleanout aperture which is usually provided in the fuel cell. This step is called the "stripping" operation.

To facilitate the stripping of the form from the interior of the fuel cell, a so-called "break-away agent" is painted onto the surface of the building form. This agent is an adhesive, usually a water soluble glue, which enables the fuel cell material to adhere firmly to the building surface in the building operation. The agent is intended to form a complete covering which, since it is water-soluble, will dissolve completely in the stripping operation, and its use enables the form to be pulled free from the interior of the fuel cell. However, the water soluble glue normally has a melting or softening point at about the same temperature as the vulcanizing temperature of the fuel cell and when the fuel cell shrinks upon the form during the vulcanizing operation, the force of shrinkage will cause the softened glue to migrate away from the areas of greatest pressure resulting in a direct contact between the fuel cell and the building form at such areas. These areas of pressure are usually at the corners and edges of the building form, and it is at these points that the building form proves most difficult to strip away from the fuel cell.

The present invention solves this problem of migration of the break-away agent during the vulcanizing operation and the resultant difficulty in stripping, by providing means to hold sufficient quantities of the break-away agent in the critical areas of maximum pressure. The invention contemplates the use of porous fabric strips which can be applied directly to the edges and corners of the building form, and elsewhere if necessary, and which are capable of retaining substantial amounts of break-away agent within its porous structure. Usually the fabric is saturated with the break-away agent before being applied to the building form, but, if desirable, the strips may be laid on the form and the break-away agent applied to the form and to the fabric at that time.

When the fuel cell is subjected to vulcanizing temperatures, the porous strips hold a sufficient quantity of the break-away agent in place to enable an ease of stripping thereafter. The porous fabric material thus functions primarily to hold the break-away agent in the desired position. In the stripping operation, after the building form has been soaked in water, the strips retain sufficient strength to remain intact and they can be readily stripped from the exterior of the fuel cell. The invention has enabled smaller quantities of a break-away agent to be used and has resulted in a greater ease of stripping.

A number of varieties of porous fabric may be used, but, as will be seen hereafter, a uni-directional weftless fabric comprising a plurality of elongated fibers bound together by suitable binder materials which are not soluble in water is preferred. Such a material does not lose its tensile strength to any degree as a result of the vulcanizing operation and the subsequent water soaking operation and it can be readily stripped from the fuel cell.

An object of the invention therefore is to provide means to facilitate the stripping of a building form from the interior of a vulcanized fuel cell.

A more specific object is to provide means to retain sufficient quantities of break-away agent in place on a building form for fuel cells to provide ready stripping of the form from the fuel cell after vulcanization.

Yet a more specific object is to provide strips of porous fabric which may be adhered to the exterior of a building form for fuel cells, the porosities of the fabric retaining substantial quantities of break-away agent in place on the form.

These and other objects and advantages will be more fully apparent from the following description of a preferred form of the invention, reference being had to the accompanying drawings in which:

Figure 1 is a perspective view of a building form for a fuel cell showing the absorbent fiber strips of the present invention applied to the edges of the form.

Figure 2 is a perspective view of a fuel cell assembled and molded on the form of Figure 1.

Figure 3 is a fragmentary plan view showing the fibrous nature of the fabric strips.

Figure 4 is a perspective view of the fuel cell of Figure 3 showing the manner in which the form is "stripped" from the fuel cell.

The invention is illustrated in connection with a fuel cell, indicated generally at 10, see Figure 3, which is built and vulcanized on a building form 11, see Figure 1. The fuel cell 10 is generally rectangular in section and is adapted to fit snugly within an appropriate cavity in an airplane wing. Obviously it may be of any desired shape and size. The cell is shown with the usual cleanout aperture 13 which provides access to the interior of the fuel cell for cleaning, inspection and repair. The construction of the fuel cell per se is conventional and since it forms no part of the present invention, will not be described in detail.

The building form 11 has the size and shape necessary to produce the fuel cell 10 and is likewise of conventional construction being built up, either from a material such as corrugated paper board or papier-mâché which has sufficient stretch and rigidity to support the fuel cell during the building and vulcanizing operations but which will weaken and disintegrate when soaked in water during the stripping operation. Obviously, the building forms may be made of any other material having equivalent properties.

As mentioned above, before the fuel cell is assembled on the form, the form is coated with a break-away agent which is intended to dissolve in water and facilitate the removal of the form from the cell. A water-soluble glue is most commonly used as a break-away agent. It was also mentioned above that during the vulcanizing operation, which is performed in open steam in a conventional manner, the fuel cell shrinks with considerable force upon the building form 11 and in doing so tends to force the break-away agent away from the edges and corners of the building form. Consequently, the absence of the break-away agent in these areas makes much more difficult the removal of the form from the fuel cell.

This difficulty is overcome in the present invention by the provision of strips, indicated at 15, which are applied directly to the corners and edges of the building form as shown in Figure 1. The strips 15 are of porous fabric, or similar material, capable of holding considerable quantities of a break-away agent within the pores of the fabric. Preferably the strips are of a non-woven or felted fabric comprising aligned fibers of nylon, rayon or the like which are held together by a suitable binding agent. Any one of several known binding agents would be suitable so long as it can withstand the vulcanizing temperatures without introducing additional problems and so long as it is insoluble in water and thus capable of holding the fibers together in fabric form during the stripping operation. Two binders which have been used successfully are cellulose and Buna-N.

In use, a coating of break-away agent is either sprayed or painted on the building form and then the strips of fabric are applied to the desired areas. Usually the strips are saturated with break-away agent before being laid on the form but if not, the required additional amounts of break-away agent will be added to the strips after they are in place on the form. The fuel cell is then built up on the form and vulcanized in the usual manner. In the stripping operation, the paper body of the form is readily stripped from the fuel cell and removed through the clean-out opening 13, because the porous strips hold the water-soluble break-away agent in place and prevent it from migrating under pressure.

Although the invention is described with reference to strips of a non-woven felted fabric, it will be apparent that many of the advantages of the invention may be realized by the use of other fabrics or porous materials having similar properties. Although the strips are shown applied at the corners and edges of the form, the fabric will be used at any area where migration of the break-away agent causes stripping difficulties.

These and other modifications will occur to those skilled in the art without departing from the spirit and scope of the invention, the features of which are summarized in the claims below.

I claim:

1. In a building form for an aircraft fuel cell or the like comprising a form body adapted to support the cell for the assembly and vulcanizing operations, the improvement comprising a porous material applied to the building form at the areas where the cell exerts the greatest pressure upon said form during said vulcanizing operation, said porous material being capable of holding substantial quantities of break-away agent at said areas whereby to facilitate the subsequent stripping of said building form from said fuel cell.

2. In a building form for an aircraft fuel cell or the like comprising a form body adapted to support the cell for the assembly and vulcanizing operations, the improvement comprising a porous fabric material applied to the building form at the areas where the cell exerts the greatest pressure upon said form during said vulcanizing operation, said porous fabric material being capable of holding substantial quantities of break-away agent at said areas whereby to facilitate the subsequent stripping of said building form from said fuel cell.

3. In a building form for an aircraft fuel cell or the like comprising a form body adapted to support the cell for the assembly and vulcanizing operations, the improvement comprising a porous, unwoven, felted fabric material applied to the building form at the areas where the cell exerts the greatest pressure upon said form during said vulcanizing operation, said porous, unwoven, felted fabric material being capable of holding substantial quantities of break-away agent at said areas whereby to facilitate the subsequent stripping of said building form from said fuel cell.

4. In a building form for an aircraft fuel cell or the like comprising a body adapted to support the cell for the assembly and vulcanizing operations, the improvement comprising a porous fabric material applied to the building form at the areas where the cell exerts the greatest pressure upon said form during said vulcanizing operation, said porous fabric material comprising substantially aligned fibers held together by a water insoluble binding agent and said fabric being capable of holding substantial quantities of break-away agent at said areas whereby to facilitate the subsequent stripping of said building form from said fuel cell.

5. In a building form for an aircraft fuel cell or the like comprising a body adapted to support the cell for the assembly and vulcanizing operations, the improvement comprising a porous fabric material applied to the building form at the areas where the cell exerts the greatest pressure upon said form during said vulcanizing operation, said porous fabric material comprising substantially aligned nylon fibers held together by a water insoluble binding agent and said fabric being capable of holding substantial quantities of break-away agent at said areas whereby to facilitate the subsequent stripping of said building form from said fuel cell.

References Cited in the file of this patent

UNITED STATES PATENTS

| | | |
|---|---|---|
| 2,285,502 | Dreyfus | June 9, 1942 |
| 2,348,935 | Smith et al. | May 16, 1944 |
| 2,394,492 | Scharenberg | Feb. 5, 1946 |